United States Patent
Chen et al.

(10) Patent No.: US 11,839,820 B2
(45) Date of Patent: Dec. 12, 2023

(54) METHOD AND APPARATUS FOR GENERATING GAME CHARACTER MODEL, PROCESSOR, AND TERMINAL

(71) Applicant: NETEASE (HANGZHOU) NETWORK CO., LTD., Zhejiang (CN)

(72) Inventors: Kang Chen, Zhejiang (CN); Weidong Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/632,396

(22) PCT Filed: Apr. 30, 2019

(86) PCT No.: PCT/CN2019/085235
§ 371 (c)(1),
(2) Date: Jan. 20, 2020

(87) PCT Pub. No.: WO2020/133862
PCT Pub. Date: Jul. 2, 2020

(65) Prior Publication Data
US 2021/0291056 A1    Sep. 23, 2021

(30) Foreign Application Priority Data
Dec. 27, 2018    (CN) .......................... 201811610934.1

(51) Int. Cl.
*A63F 13/65*    (2014.01)

(52) U.S. Cl.
CPC .................................... *A63F 13/65* (2014.09)

(58) Field of Classification Search
CPC .................... A63F 13/655; A63F 2300/5553
See application file for complete search history.

(56) References Cited

U.S. PATENT DOCUMENTS

| | | | |
|---|---|---|---|
| 5,809,322 A * | 9/1998 | Akerib | G06V 10/955 710/33 |
| 5,848,926 A * | 12/1998 | Jardetzky | A63H 33/048 273/DIG. 30 |
| 6,677,967 B2 * | 1/2004 | Sawano | G06T 11/60 715/848 |

(Continued)

FOREIGN PATENT DOCUMENTS

| | | |
|---|---|---|
| CN | 1797474 A | 7/2006 |
| CN | 101968892 A | 2/2011 |

(Continued)

*Primary Examiner* — Seng H Lim
(74) *Attorney, Agent, or Firm* — Gang Yu (57) ABSTRACT

A method and apparatus for generating a game character model, a processor, and a terminal are provided. The method includes: a user map corresponding to a two-dimensional user image to be used is acquired; the user map is mapped to an initial map of a game character to obtain a mapped map of the game character; and the mapped map and a game character grid are fused to generate a game character model. The present disclosure solves the technical problem that face mapping and face fusion provided in the related art are generally applied to two-dimensional face images but cannot be applied to a three-dimensional game environment.

16 Claims, 2 Drawing Sheets

(56) References Cited

U.S. PATENT DOCUMENTS

| | | | |
|---|---|---|---|
| 9,855,499 B2* | 1/2018 | Meekins | A63F 13/25 |
| 2002/0082082 A1* | 6/2002 | Stamper | A63F 13/655 |
| | | | 463/32 |
| 2002/0105515 A1* | 8/2002 | Mochizuki | G06T 11/203 |
| | | | 345/419 |
| 2005/0062739 A1 | 3/2005 | Balmelli et al. | |
| 2015/0172637 A1* | 6/2015 | Yoon | G06T 17/00 |
| | | | 348/46 |
| 2016/0247308 A1* | 8/2016 | Jiao | G06T 15/503 |
| 2018/0158230 A1* | 6/2018 | Yan | G06V 40/168 |
| 2018/0308276 A1* | 10/2018 | Cohen | G06T 13/40 |
| 2020/0151963 A1* | 5/2020 | Lee | G06T 15/04 |
| 2021/0012530 A1* | 1/2021 | Zheng | G06T 7/60 |
| 2021/0209835 A1* | 7/2021 | Fonseka | G06T 17/20 |

FOREIGN PATENT DOCUMENTS

| | | |
|---|---|---|
| CN | 102663820 A | 9/2012 |
| CN | 108765272 A | 11/2018 |
| CN | 109675315 A | 4/2019 |

\* cited by examiner

METHOD AND APPARATUS FOR GENERATING GAME CHARACTER MODEL, PROCESSOR, AND TERMINAL

CROSS-REFERENCE TO RELATED APPLICATIONS

The present disclosure claims benefit of China Patent Application No. 201811610934.1, filed on Dec. 27, 2018, contents of which are hereby incorporated by reference in its entirety.

TECHNICAL FIELD

The present disclosure relates to the field of computers, and in particular to a method and apparatus for generating a game character model, a processor, and a terminal.

BACKGROUND

At present, image-based face fusion, face swap, and face morphing are common applications. At an algorithm level, an operation process of these applications is mainly divided into two steps: face mapping and face fusion.

With regard to face mapping, since face positions in two different real images will be biased, it is difficult to achieve a desired effect when the two different real images are directly fused. For this reason, face mapping is performed between face areas of the two different real images, so as to solve a problem of alignment of the face areas at pixel positions in the two different real images.

With regard to face fusion, after performing pixel-level alignment processing on the face areas of the two different real images, face fusion may be performed. According to requirements of different applications, either a weighted average of the pixel values of the two different real images for the same position may be selected according to a certain ratio, or a Poisson fusion mode may be used for obtaining a more natural edge transition effect.

However, face mapping and face fusion provided in the related art are generally applied to two-dimensional face images, and the operation process usually includes the following executable steps.

AT first step, face detection and key point location are performed to automatically detect a face area from a two-dimensional face image and locate multiple feature points in key areas such as face edges, eyebrows, eyes, nose, and mouth.

At second step, Delaunay triangulation is performed on the two-dimensional face image according to the multiple feature points.

At third step, a face mapping relationship between a source image and a target image is calculated according to the Delaunay triangulation. The calculation method is as follows. For each pixel point p in the target image, numbers D1, D2, and D3 of three vertices, which belong to the multiple feature points mentioned above, of a triangle to which the three vertices belongs are found, and barycentric coordinates (u, v, w) of p with respect to the three vertices are calculated. A pixel at the position of the barycentric coordinates (u, v, w) in a triangle formed by three feature points S1, S2, and S3 that have the same number in the source image is the pixel corresponding to the pixel p.

At fourth step, the source image is fused into the target image through a fusion mode corresponding to different application scenarios.

Through the above executable steps, more dramatic results can be achieved in face fusion for two-dimensional images. However this solution is essentially applied to scenes where targets that are two-dimensional (for example, photos, posters, etc.) faces are fused, which is difficult to be applied to three-dimensional environments.

If the above solution is directly applied to a face swap of a three-dimensional game character, it is necessary to fuse a face of a user into a two-dimensional image rendered by the three-dimensional game character. However, this method cannot achieve satisfactory results both in terms of processing efficiency and processing effect. On the one hand, in a three-dimensional game, the effect of game character rendering on a two-dimensional image changes in real time with various factors such as game character movement, camera orientation, lighting, and post-processing. The above two-dimensional face fusion algorithm cannot meet the real-time requirements in terms of processing speed, so the two-dimensional face fusion algorithm cannot be integrated into a three-dimensional game system. On the other hand, three-dimensional games often present artistic visual effects. There is a certain artistic exaggeration in both the face shape of the game characters and the light and shadow effects in the game. There are certain gaps with real-life images, and the gaps will also greatly destroy face mapping and fusion effects.

As to the problem mentioned above, no effective solution has been provided yet.

SUMMARY

At least some embodiments of the present disclosure provide a method and apparatus for generating a game character model, a processor, and a terminal, so as at least to partially solve a technical problem that face mapping and face fusion provided in the related art are generally applied to two-dimensional face images but cannot be applied to a three-dimensional game environment.

In an embodiment of the present disclosure, a method for generating a game character model is provided, which may include that:

a user map corresponding to a two-dimensional user image to be used is acquired; the user map is mapped to an initial map of a game character to obtain a mapped map of the game character; and the mapped map and a game character grid are fused to generate a game character model.

Optionally, the operation that the user map corresponding to the two-dimensional user image to be used is acquired may include that: three-dimensional reconstruction is performed on the two-dimensional user image to be used to obtain a three-dimensional model of the two-dimensional user image to be used; and the user map is obtained according to the three-dimensional model.

Optionally, before the user map is mapped to the initial map to obtain the mapped map, the method may further include that: a coding image of a relationship map is configured according to a resolution of the user map, and texture coordinates of a pixel corresponding to the pixel in the coding image of a relationship map in the initial map of the game character are stored through a value of each pixel in the coding image of a relationship map.

Optionally, the operation that the user map is mapped to the initial map to obtain the mapped map may include that: for each pixel in the user map, a value of a pixel in the coding image of the relationship map corresponding to the pixel in the user map is read respectively; and the value of the pixel in the coding image of the relationship map is decoded to obtain texture coordinates and, pixels to be mapped from the pixels in the user map in the initial map are determined according to the texture coordinates to obtain the mapped map.

Optionally, before the user map corresponding to the two-dimensional user image to be used is acquired, the method may further include that: an initial two-dimensional user image is acquired; and a part in the initial two-dimensional user image that meets a preset image threshold is processed to obtain the two-dimensional user image to be used.

Optionally, after the user map is mapped to the initial map to obtain the mapped map, the method may further include that: a skin color of the game character is adjusted according to a user skin color to obtain an adjustment result; and the adjustment result is fused to the mapped map.

Optionally, after the mapped map and the game character grid are fused to generate the game character model, the method may further include that: a makeup template matching the initial two-dimensional user image is acquired; and makeup art resources corresponding to the makeup template are superimposed on the game character model.

Optionally, the two-dimensional user image to be used may be a two-dimensional face image to be used, and the game character model may be a game character face model.

In another embodiment of the present disclosure, an apparatus for generating a game character model is also provided, which may include:

an acquisition component, configured to acquire a user map corresponding to a two-dimensional user image to be used; a mapping component, configured to map the user map to an initial map of a game character to obtain a mapped map of the game character; and a generation component, configured to fuse the mapped map and a game character grid to generate a game character model.

Optionally, the acquisition component may include: a reconstruction element, configured to perform three-dimensional reconstruction on the two-dimensional user image to be used to obtain a three-dimensional model of the two-dimensional user image to be used; and an acquisition element, configured to obtain the user map according to the three-dimensional model.

Optionally, the apparatus may further include: a first processing component, configured to configure a coding image of a relationship map according to a resolution of the user map, and store, through a value of each pixel in the coding image of the relationship map, texture coordinates of a pixel corresponding to the pixel in the coding image of the relationship map in the initial map of the game character.

Optionally, the mapping component may include: a reading element, configured to, for each pixel in the user map, respectively read a value of a pixel in the coding image of the relationship map corresponding to the pixel in the user map; and a mapping element, configured to decode the value of the pixel in the coding image of the relationship map to obtain texture coordinates and, determine pixels to be mapped from the pixels in the user map in the initial map according to the texture coordinates to obtain the mapped map.

Optionally, the apparatus may further include: a second processing component, configured to acquire an initial two-dimensional user image, and process a part in the initial two-dimensional user image that meets a preset image threshold to obtain the two-dimensional user image to be used.

Optionally, the apparatus may further include: a third processing component, configured to adjust a skin color of the game character according to a user skin color to obtain an adjustment result, and fuse the adjustment result to the mapped map.

Optionally, the apparatus may further include: a fourth processing component, configured to acquire a makeup template matching the initial two-dimensional user image, and superimpose makeup art resources corresponding to the makeup template on the game character model.

Optionally, the two-dimensional user image to be used may be a two-dimensional face image to be used, and the game character model may be a game character face model.

In another embodiment of the present disclosure, a storage medium is also provided, which includes a stored program. When the stored program is run, a device where the storage medium is located may be controlled to perform the method for generating a game character model as mentioned above.

In another embodiment of the present disclosure, a processor is also provided. The processor may be configured to run a program. When the program is run, the method for generating a game character model as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the method for generating a game character model as mentioned above.

In at least some embodiments of the present disclosure, the user map corresponding to the two-dimensional user image to be used is acquired, the user map is mapped to the initial map of the game character to obtain the mapped map of the game character, and the mapped map and the game character grid are fused to generate the game character model. The purpose of automatically modifying the appearance of the game character according to the two-dimensional user image to fuse local features (such as face skin colors, freckles, or nasolabial folds) in the two-dimensional user image into the game character according to a certain ratio, thereby achieving the technical effects of improving processing efficiency, optimizing visual effects, and greatly expanding the degree of freedom of face pinching gameplay, and further solving the technical problem that face mapping and face fusion provided in the related art are generally applied to two-dimensional face images but cannot be applied to a three-dimensional game environment.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

First, some nouns or terms that appear during the description of at least some embodiments of the present disclosure are applied to the following explanations.

At one, face mapping refers to giving two parameter spaces A and B about a face model. For each point in the parameter space A, a corresponding point is found in the parameter space B. In at least some embodiments of the present disclosure, the dimension of the parameter space has a clear physical meaning. The two-dimensional parameter space corresponds to a two-dimensional image, and the three-dimensional parameter space corresponds to a three-dimensional model. According to different dimensions of the parameter space A and the parameter space B, the parameter space A and the parameter space B may be divided into the following multiple situations.

Situation one is a 2D-2D mapping. That is, the parameter space A is a face image of a user, and the parameter space B is an image formed by rendering a three-dimensional game character.

Situation two is a 3D-3D mapping. That is, the parameter space A is a three-dimensional face model of a user, and the parameter space B is a three-dimensional game character model.

Situation three is a 2D-3D mapping. That is, the parameter space A is a face image of a user, and the parameter space B is a three-dimensional game character model.

At two, face fusion refers to natural fusion of faces in one image into a face area of another image according to a preset ratio. If the fusion ratio is 100%, the face fusion is expressed as face swap. If the process of the fusion ratio from 0% to 100% is played in a form of frame animation, the face fusion is expressed as face morphing.

In an embodiment of the present disclosure, a method for generating a game character model is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission device for communication functions, an input/output device, and a display device. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the method for generating a game character model in the embodiment of the present disclosure, and the processor executes various functional applications and data processing by running the computer program stored in the memory, that is, implements the above method for generating a game character model. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

The display device may be, for example, a Liquid Crystal Display (LCD) through which a user may interact with a user interface of the mobile terminal.

Figure 1:
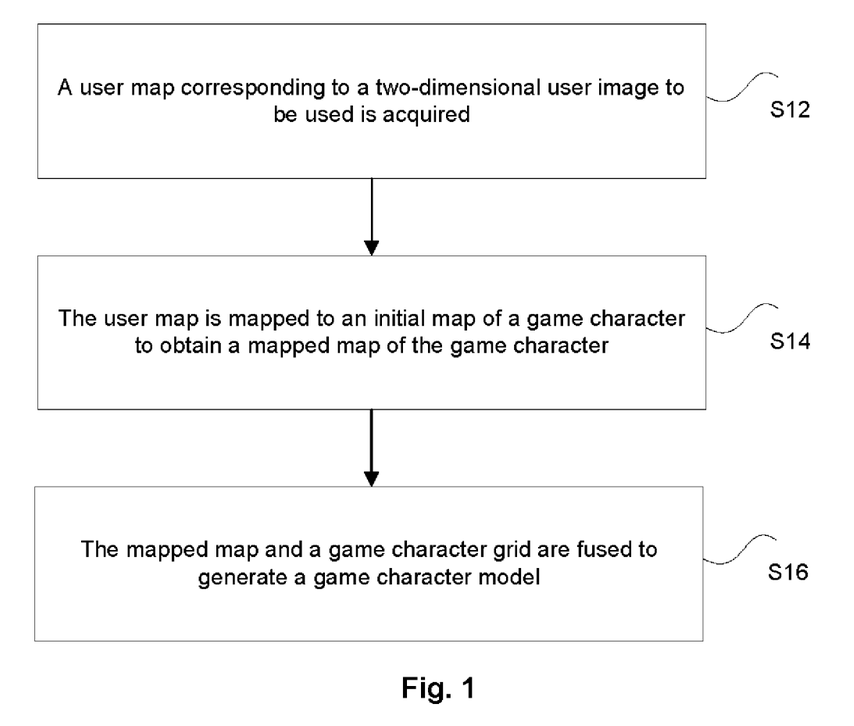
FIG. 1 is a flowchart of a method for generating a game character model according to an embodiment of the present disclosure.

In the present embodiment, a method for generating a game character model running on the mobile terminal is provided. FIG. 1 is a flowchart of a method for generating a game character model according to an embodiment of the present disclosure. As shown in FIG. 1, the method includes the following steps.

At step S12, a user map corresponding to a two-dimensional user image to be used is acquired.

At step S14, the user map is mapped to an initial map of a game character to obtain a mapped map of the game character.

At step S16, the mapped map and a game character grid are fused to generate a game character model.

By means of the above steps, the user map corresponding to the two-dimensional user image to be used is acquired, the user map is mapped to the initial map of the game character to obtain the mapped map of the game character, and the mapped map and the game character grid are fused to generate the game character model. The purpose of automatically modifying the appearance of the game character according to the two-dimensional user image to fuse local features (such as face skin colors, freckles, or nasolabial folds) in the two-dimensional user image into the game character according to a certain ratio, thereby achieving the technical effects of improving processing efficiency, optimizing visual effects, and greatly expanding the degree of freedom of face pinching gameplay, and further solving the technical problem that face mapping and face fusion provided in the related art are generally applied to two-dimensional face images but cannot be applied to a three-dimensional game environment.

In an optional embodiment, the two-dimensional user image to be used is a two-dimensional face image to be used, and the game character model is a game character face model. It should be noted that the following description is performed using an example of acquiring a game character face model through a two-dimensional face image, but it does not constitute an improper limitation on the present disclosure. For example, in addition to acquiring the game character face model through the two-dimensional face image, a corresponding part model of the game character may also be acquired through two-dimensional images of other parts (e.g., hands or legs) of the user.

Optionally, at step S12, the operation that the user map corresponding to the two-dimensional user image to be used is acquired includes the following executable steps.

At step S121, three-dimensional reconstruction is performed on the two-dimensional user image to be used to obtain a three-dimensional model of the two-dimensional user image to be used.

At step S122, the user map is obtained according to the three-dimensional model.

There are many different algorithm frameworks for three-dimensional face reconstruction according to an input or output data form and the accuracy requirements of reconstruction. In an optional embodiment of the present disclosure, the three-dimensional face reconstruction mainly refers to three-dimensional face reconstruction according to a single image. The three-dimensional face reconstruction may collect a large amount of three-dimensional face data in advance to construct a principal component analysis basis for a three-dimensional face shape to obtain a three-dimensional face base, and then uses the three-dimensional face base to fit two-dimensional faces in a user image to obtain a corresponding three-dimensional model.

In a specific implementation process, first, a user face in a two-dimensional face image to be used is three-dimensionally reconstructed to form a three-dimensional model of the two-dimensional face image to be used, thereby ensuring that there is a known 2D-3D mapping relationship between the two-dimensional face image to be used and the three-dimensional model of the two-dimensional face image to be used. Second, a 3D-3D mapping relationship between the three-dimensional model of the two-dimensional face image to be used and a three-dimensional face model of the game character is established. It is considered that each three-dimensional model may be composed of three-dimensional grids and maps. The map may be regarded as a parametric representation of the three-dimensional grid on a two-dimensional plane. That is, each point on the three-dimensional model may find corresponding pixel in the map space according to texture coordinates (u, v). Therefore, the corresponding face map may be obtained through the three-dimensional model of the two-dimensional face image to be used and the corresponding initial face map of the game character may be obtained through the three-dimensional face model of the game character. Then, through mapping the face map to the initial face map of the game character, the initial face map of the game character is replaced with the face map to obtain a mapped face map of the game character.

Optionally, before step S14, the user map is mapped to the initial map to obtain the mapped map, the method may further include the following executable step.

At step S13, a coding image of a relationship map is configured according to a resolution of the user map, and texture coordinates of a pixel corresponding to the pixel in the coding image of the relationship map in the initial map of the game character are stored through a value of each pixel in the coding image of the relationship map.

In order to be able to establish a face mapping relationship between the above-mentioned face map and the initial face map of the game character, the coding image of the relationship map is to be constructed in advance. The resolution of the mapping relation coding image is usually determined by the resolution of the face map obtained from the three-dimensional model of the two-dimensional face image, which may be an image with the same resolution as the face map. The number of constructing coding images of the relationship maps is usually determined by the number of game characters configured in the game. In an optional embodiment, the number of coding images of relationship maps is the same as the number of game characters configured in the game. In a process of establishing the above-mentioned face mapping relationship, it is necessary to determine the coding image of the relationship map to be used according to the game character selected by a user in the game. Each pixel of each mapping relationship encoding image may include four channels of RGBA, which are used for encoding the texture coordinates of corresponding pixels in the initial face map of the game character. In an optional implementation manner, the RG channel may be used for encoding the u coordinate of the corresponding pixel in the initial face map, the BA channel may be used for encoding the v coordinate of the corresponding pixel in the initial face map, and then the encoding result is stored in a value of each pixel of the coding image of the relationship map to be used.

Optionally, at step S14, the operation that the user map is mapped to the initial map to obtain the mapped map may include the following executable steps.

At step S141, for each pixel in the user map, a value of a pixel in the coding image of a relationship map corresponding to the pixel in the user map is read respectively.

At step S142, the value of the pixel in the coding image of the relationship map is decoded to obtain texture coordinates and, pixels to be mapped from the pixels in the user map in the initial map are determined according to the texture coordinates to obtain the mapped map.

For each pixel in the face map of the user, the value of the pixel in the coding image of the relationship map corresponding to the pixel in the user map is read and decoded to obtain texture coordinates, which are pixels to be mapped on the initial face map of the game character, and then the pixels in the face map are used for replacing the pixels to be mapped on the initial face map to obtain a mapped map.

Optionally, before step S12, the user map corresponding to the two-dimensional user image to be used is acquired, the method may further include the following executable steps.

At step S10, an initial two-dimensional user image is acquired.

At step S11, a part in the initial two-dimensional user image that meets a preset image threshold is processed to obtain the two-dimensional user image to be used.

In the face fusion process of the two-dimensional face image of the user and the three-dimensional face model of the game character, according to the mapping relationship between the two-dimensional face image and the three-dimensional model of the game character, all pixels in the face area in the two-dimensional face image could be directly mapped into the three-dimensional face model of the game character. However, due to various factors such as lighting, occlusion, and noise, some pixels in the face area of the two-dimensional face image are of poor quality. If the pixels are all mapped into the three-dimensional face model of the game character, the subsequent fusion effect has a negative impact. Therefore, before performing the mapping, it is first necessary to use an image processing method to automatically pre-process (such as removing highlights, shadows, noise, and bangs) the two-dimensional face image, part of the face area of better quality is obtained by segmentation, and then information in the part of the face area of better quality is mapped into the face map of the game character according to the mapping relationship between the two-dimensional face image constructed above and the three-dimensional face model of the game character.

Optionally, after step S14, the user map is mapped to the initial map to obtain the mapped map, the method may further include the following executable step.

At step S15, a skin color of the game character is adjusted according to a user skin color to obtain an adjustment result, and the adjustment result is fused to the mapped map.

In an optional embodiment, after mapping the information in the part of the face area of better quality to the face map of the game character, image completion processing is further performed. Moreover, it is also necessary to adjust the skin color of the game character according to the skin color of the user, so that the two colors are as close as possible, and the adjustment result is fused to the mapped face map in a Poisson fusion manner.

Optionally, after step S16, the mapped map and the game character grid are fused to generate the game character model, the method may further include the following executable steps.

At step S17, a makeup template matching the initial two-dimensional user image is acquired.

At step S18, makeup art resources corresponding to the makeup template are superimposed on the game character model.

In an optional embodiment of the present disclosure, makeup art resources (such as eyebrows, eye shadows, beards, and lip glosses) common to human faces may be pre-configured to identify and match a makeup template closest to the initial two-dimensional face image according to image processing and pattern identification methods, and then the makeup art resources corresponding to the makeup template are further superimposed to the face model of the game character in an alpha blending manner to form a final display result.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. According to such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an apparatus for generating a game character model is further provided, which is configured to implement the above embodiments and preferred implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 2:
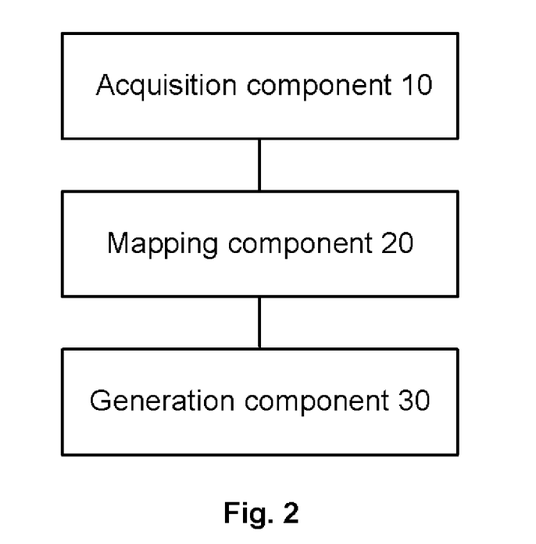
FIG. 2 is a structural block diagram of an apparatus for generating a game character model according to an embodiment of the present disclosure.

FIG. 2 is a structural block diagram of an apparatus for generating a game character model according to an embodiment of the present disclosure. As shown in FIG. 2, the apparatus includes: an acquisition component 10, configured to acquire a user map corresponding to a two-dimensional user image to be used; a mapping component 20, configured to map the user map to an initial map of a game character to obtain a mapped map of the game character; and a generation component 30, configured to fuse the mapped map and a game character grid to generate a game character model.

Optionally, the acquisition component 10 includes: a reconstruction element (not shown in the figure), configured to perform three-dimensional reconstruction on the two-dimensional user image to be used to obtain a three-dimensional model of the two-dimensional user image to be used; and an acquisition element (not shown in the figure), configured to obtain the user map according to the three-dimensional model.

Figure 3:
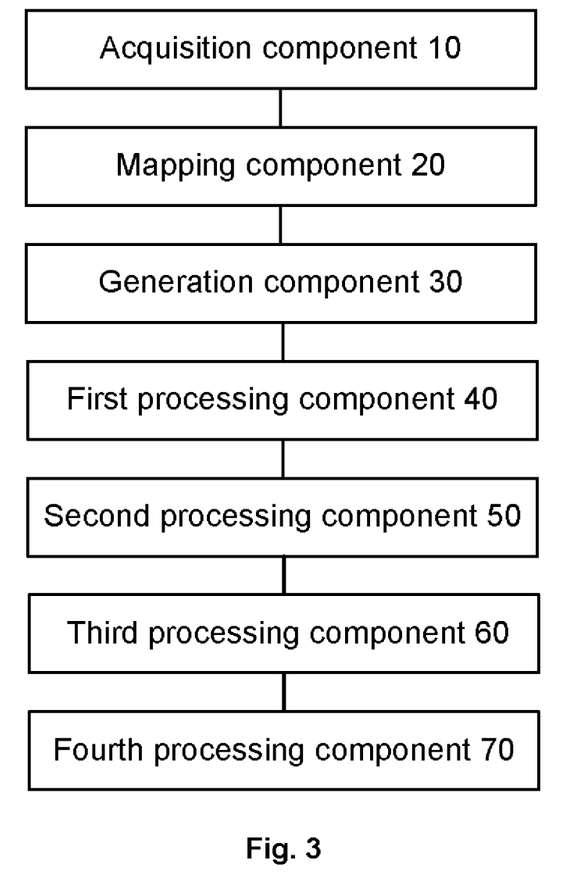
FIG. 3 is a structural block diagram of an apparatus for generating a game character model according to an optional embodiment of the present disclosure.

Optionally, FIG. 3 is a structural block diagram of an apparatus for generating a game character model according to an optional embodiment of the present disclosure. As shown in FIG. 3, the apparatus further includes: a first processing component 40, configured to configure a coding image of a relationship map according to a resolution of the user map, and store, through a value of each pixel in the coding image of the relationship map, texture coordinates of a pixel corresponding to the pixel in the coding image of the relationship map in the initial map of the game character.

Optionally, the mapping component 20 includes: a reading element (not shown in the figure), configured to, for each pixel in the user map, respectively read a value of a pixel in the coding image of the relationship map corresponding to the pixel in the user map; and a mapping element (not shown in the figure), configured to decode the value of the pixel in the coding image of the relationship map to obtain texture coordinates and, determine pixels to be mapped from the pixels in the user map in the initial map according to the texture coordinates to obtain the mapped map.

Optionally, as shown in FIG. 3, the apparatus further includes: a second processing component 50, configured to acquire an initial two-dimensional user image, and process a part in the initial two-dimensional user image that meets a preset image threshold to obtain the two-dimensional user image to be used.

Optionally, as shown in FIG. 3, the apparatus further includes: a third processing component 60, configured to adjust a skin color of the game character according to a user skin color to obtain an adjustment result, and fuse the adjustment result to the mapped map.

Optionally, as shown in FIG. 3, the apparatus further includes: a fourth processing component 70, configured to acquire a makeup template matching the initial two-dimensional user image, and superimpose makeup art resources corresponding to the makeup template on the game character model.

Optionally, the two-dimensional user image to be used is a two-dimensional face image to be used, and the game character model is a game character face model.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, and the computer program is configured to perform the steps in any one of the above method embodiments during running.

Optionally, in the present embodiment, the storage medium may be configured to store the computer program for performing the following steps.

At step S1, a user map corresponding to a two-dimensional user image to be used is acquired.

At step S2, the user map is mapped to an initial map of a game character to obtain a mapped map of the game character.

At step S3, the mapped map and a game character grid are fused to generate a game character model.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure also provides a processor. The processor is configured to run a computer program to perform the steps in any one of the above method embodiments.

Optionally, in the present embodiment, the processor may be configured to perform the following steps through the computer program.

At step S1, a user map corresponding to a two-dimensional user image to be used is acquired.

At step S2, the user map is mapped to an initial map of a game character to obtain a mapped map of the game character.

At step S3, the mapped map and a game character grid are fused to generate a game character model.

Optionally, a specific example in the present embodiment may refer to the examples described in the above embodiments and optional implementation manners, and details are not described herein in the present embodiment.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and at least two elements may also be integrated into a element. The integrated element may be implemented in a hardware form and may also be implemented in form of software functional element.

The integrated element may be stored in a computer-readable storage medium if being implemented in the form of a software functional element and sold or used as a standalone product. According to such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementation of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for generating a game character model, comprising:
   acquiring a user map corresponding to a two-dimensional user image to be used;
   mapping the user map to an initial map of a game character to obtain a mapped map of the game character; and
   fusing the mapped map and a game character grid to generate a game character model;
   wherein acquiring a user map corresponding to a two-dimensional user image to be used comprises: performing three-dimensional reconstruction on the two-dimensional user image to be used to obtain a three-dimensional model of the two-dimensional user image to be used; and obtaining the user map according to the three-dimensional model;

wherein mapping the user map to an initial map of a game character to obtain a mapped map of the game character comprises: mapping pixels in the user map to pixels to be mapped in the initial map corresponding to a three-dimensional face model of the game character, to obtain the mapped map of the game character, according to a preset relationship;

wherein the preset relationship comprises a coding image of a relationship map, and before mapping the user map to the initial map to obtain the mapped map, the method further comprises: configuring the coding image according to a resolution of the user map, and storing, through a value of each pixel in the coding image, texture coordinates of a pixel corresponding to the pixel in the coding image in the initial map of the game character, wherein the texture coordinates are the pixels to be mapped in the initial face map;

wherein the coding image is used for determining the pixels to be mapped in the initial map of the game character, wherein the pixels to be mapped in the initial map of the game character is corresponding to the pixels in the user map, and the pixels in the user map are used for replacing the pixels to be mapped in the initial map to obtain the mapped map;

wherein the coding image is an image with the same resolution as the user map, and the number of the coding image is determined by the number of the game characters;

wherein storing, through a value of each pixel in the coding image, texture coordinates of a pixel corresponding to the pixel in the coding image in the initial map of the game character comprises: encoding a horizontal coordinate of a pixel corresponding to the pixel in the coding image in the initial map, through R channel and G channel of the pixel in the coding image, and encoding a vertical texture coordinate of a pixel corresponding to the pixel in the coding image in the initial map, through B channel and A channel of the pixel in the coding image.

2. The method as claimed in claim 1, wherein mapping the user map to the initial map to obtain the mapped map comprises:

for each pixel in the user map, respectively reading a value of a pixel in the coding image of the relationship map corresponding to the pixel in the user map; and decoding the value of the pixel in the coding image of the relationship map to obtain texture coordinates, and determining the pixels to be mapped from the pixels in the user map in the initial map according to the texture coordinates to obtain the mapped map.

3. The method as claimed in claim 1, wherein before acquiring the user map corresponding to the two-dimensional user image to be used, the method further comprises:

acquiring an initial two-dimensional user image; and processing a part in the initial two-dimensional user image that meets a preset image threshold to obtain the two-dimensional user image to be used.

4. The method as claimed in claim 1, wherein after mapping the user map to the initial map to obtain the mapped map, the method further comprises:

adjusting a skin color of the game character according to a user skin color to obtain an adjustment result; and fusing the adjustment result to the mapped map.

5. The method as claimed in claim 1, wherein after fusing the mapped map and the game character grid to generate the game character model, the method further comprises:

acquiring a makeup template matching the initial two-dimensional user image; and superimposing makeup art resources corresponding to the makeup template on the game character model.

6. The method as claimed in claim 1, wherein the two-dimensional user image to be used is a two-dimensional face image to be used, and the game character model is a game character face model.

7. A non-transitory storage medium, comprising a stored program, wherein when the stored program is run, a device where the storage medium is located is controlled to perform the following steps:

acquiring a user map corresponding to a two-dimensional user image to be used;

mapping the user map to an initial map of a game character to obtain a mapped map of the game character; and fusing the mapped map and a game character grid to generate a game character model;

wherein acquiring a user map corresponding to a two-dimensional user image to be used comprises: performing three-dimensional reconstruction on the two-dimensional user image to be used to obtain a three-dimensional model of the two-dimensional user image to be used; and obtaining the user map according to the three-dimensional model;

wherein mapping the user map to an initial map of a game character to obtain a mapped map of the game character comprises: mapping pixels in the user map to pixels to be mapped in the initial map corresponding to a three-dimensional face model of the game character, to obtain the mapped map of the game character, according to a preset relationship;

wherein the preset relationship comprises a coding image of a relationship map, and before mapping the user map to the initial map to obtain the mapped map, the method further comprises: configuring the coding image according to a resolution of the user map, and storing, through a value of each pixel in the coding image, texture coordinates of a pixel corresponding to the pixel in the coding image in the initial map of the game character, wherein the texture coordinates are the pixels to be mapped in the initial face map;

wherein the coding image is used for determining the pixels to be mapped in the initial map of the game character, wherein the pixels to be mapped in the initial map of the game character is corresponding to the pixels in the user map, and the pixels in the user map are used for replacing the pixels to be mapped in the initial map to obtain the mapped map;

wherein the coding image is an image with the same resolution as the user map, and the number of the coding image is determined by the number of the game characters;

wherein storing, through a value of each pixel in the coding image, texture coordinates of a pixel corresponding to the pixel in the coding image in the initial map of the game character comprises: encoding a horizontal coordinate of a pixel corresponding to the pixel in the coding image in the initial map, through R channel and G channel of the pixel in the coding image, and encoding a vertical texture coordinate of a pixel corresponding to the pixel in the coding image in the initial map, through B channel and A channel of the pixel in the coding image.

8. A terminal, comprising: at least one processor, a memory, a display device, and at least one program, wherein the at least one program is stored in the memory, and configured to be run by the at least one processor, the at least one program being configured to perform the following steps:

acquiring a user map corresponding to a two-dimensional user image to be used;

mapping the user map to an initial map of a game character to obtain a mapped map of the game character; and fusing the mapped map and a game character grid to generate a game character model;

wherein acquiring a user map corresponding to a two-dimensional user image to be used comprises: performing three-dimensional reconstruction on the two-dimensional user image to be used to obtain a three-dimensional model of the two-dimensional user image to be used; and obtaining the user map according to the three-dimensional model;

wherein mapping the user map to an initial map of a game character to obtain a mapped map of the game character comprises: mapping pixels in the user map to pixels to be mapped in the initial map corresponding to a three-dimensional face model of the game character, to obtain the mapped map of the game character, according to a preset relationship;

wherein the preset relationship comprises a coding image of a relationship map, and before mapping the user map to the initial map to obtain the mapped map, the method further comprises: configuring the coding image according to a resolution of the user map, and storing, through a value of each pixel in the coding image, texture coordinates of a pixel corresponding to the pixel in the coding image in the initial map of the game character, wherein the texture coordinates are the pixels to be mapped in the initial face map;

wherein the coding image is used for determining the pixels to be mapped in the initial map of the game character, wherein the pixels to be mapped in the initial map of the game character is corresponding to the pixels in the user map, and the pixels in the user map are used for replacing the pixels to be mapped in the initial map to obtain the mapped map;

wherein the coding image is an image with the same resolution as the user map, and the number of the coding image is determined by the number of the game characters;

wherein storing, through a value of each pixel in the coding image, texture coordinates of a pixel corresponding to the pixel in the coding image in the initial map of the game character comprises: encoding a horizontal coordinate of a pixel corresponding to the pixel in the coding image in the initial map, through R channel and G channel of the pixel in the coding image, and encoding a vertical texture coordinate of a pixel corresponding to the pixel in the coding image in the initial map, through B channel and A channel of the pixel in the coding image.

9. The method as claimed in claim 1, wherein the three-dimensional face reconstruction refers to three-dimensional face reconstruction according to a single image.

10. The method as claimed in claim 9, wherein the three-dimensional face reconstruction collects a large amount of three-dimensional face data in advance to construct a principal component analysis basis for a three-dimensional face shape to obtain a three-dimensional face base, and then uses the three-dimensional face base to fit two-dimensional faces in a user image to obtain a corresponding three-dimensional model.

11. The method as claimed in claim 10, further comprising:

three-dimensionally reconstructing a user face in a two-dimensional face image to be used to form a three-dimensional model of the two-dimensional face image to be used; and establishing a 3D-3D mapping relationship between the three-dimensional model of the two-dimensional face image to be used and a three-dimensional face model of the game character.

12. The method as claimed in claim 11, wherein the corresponding face map is obtained through the three-dimensional model of the two-dimensional face image to be used and the corresponding initial face map of the game character is obtained through the three-dimensional face model of the game character.

13. The method as claimed in claim 12, wherein through mapping the face map to the initial face map of the game character, the initial face map of the game character is replaced with the face map to obtain a mapped face map of the game character.

14. The method as claimed in claim 1, wherein the resolution of the mapping relation coding image is determined by the resolution of the face map obtained from the three-dimensional model of the two-dimensional face image.

15. The method as claimed in claim 14, wherein the number of constructing coding images of the relationship maps is determined by the number of game characters configured in the game.

16. The method as claimed in claim 15, wherein each pixel of each mapping relationship encoding image comprises four channels of RGBA, which are used for encoding the texture coordinates of corresponding pixels in the initial face map of the game character.

* * * * *